United States Patent [19]

Tobias et al.

[11] 4,051,306

[45] Sept. 27, 1977

[54] CONTROLLED ENVIRONMENTAL DETERIORATION OF PLASTICS

[75] Inventors: John W. Tobias, East Lansing; Lynn J. Taylor, Haslett; Stuart J. Gaumer, Midland, all of Mich.

[73] Assignee: Owens-Illinois, Inc., Toledo, Ohio

[21] Appl. No.: 657,657

[22] Filed: Feb. 12, 1976

Related U.S. Application Data

[62] Division of Ser. No. 238,466, March 27, 1972, abandoned.

[51] Int. Cl.² .................................................. C08J 3/20
[52] U.S. Cl. .............................. 526/1; 260/DIG. 43; 526/914
[58] Field of Search ................... 260/DIG. 43; 526/1, 526/914

[56] References Cited

U.S. PATENT DOCUMENTS

| | | | |
|---|---|---|---|
| 2,911,398 | 11/1959 | Vandenberg | 260/93.5 A |
| 2,994,679 | 8/1961 | Jones et al. | 260/94.9 GC |
| 3,772,258 | 11/1973 | Lachowicz | 260/DIG. 43 |

OTHER PUBLICATIONS

"Modern Plastics" May 1957, pp. 170–176, 246–247.
"Macromolecules", vol. 1, pp. 97–98, Feb. 1968.
"Macromolecules", vol. 2, No. 6, pp. 587–597, Dec. 1969.
"Polymer Preprints", vol. 12, No. 2, Sept. 1971, pp. 81–90.

*Primary Examiner*—Eugene C. Rzucidlo
*Attorney, Agent, or Firm*—Donald K. Wedding

[57] ABSTRACT

There is disclosed the preparation of a degradable polymeric material consisting essentially of an organic polymeric base containing a degradation-promoting amount of a partially degraded organic polymer. The organic polymeric base and the degradation-promoting additive may be derived from the same or different polymers. The invention is especially useful in controlling the environmental deterioration of plastics. The rate of deterioration is a function of the environmental conditions such as light, oxygen, and temperature; the concentration of the additive; and the chemical structure(s) of both the base and the additive.

16 Claims, No Drawings

CONTROLLED ENVIRONMENTAL DETERIORATION OF PLASTICS

This is a division of application Ser. No. 238,466 filed Mar. 27, 1972, now abandoned.

BACKGROUND OF THE INVENTION

This invention relates to novel plastic compositions having enhanced environmental degradability.

The advent of plastics has given rise to improved methods of packaging goods. For example, polyethylene and polypropylene plastic films, bags, bottles, styrofoam cups and blister packages have the advantages of being chemically resistant, relatively unbreakable, light in weight and translucent or transparent. The increasing use of plastics in packaging applications has created a serious waste disposal problem. Burning of these plastic materials is unsatisfactory since it adds to air pollution problems.

Unlike some other packaging materials, such as paper and cardboard, plastics are not readily destroyed by the elements of nature. Thus, burying them is not an effective means of disposal, and can be expensive.

Plastics are biologically recent developments, and hence are not easily degradable by microorganisms which attack most other forms of organic matter and return them to the biological life cycle. It has been estimated that it may take millions of years for organisms to evolve which are capable of performing this function. In the meantime, plastic containers and packaging films are beginning to litter the countryside after being discarded by careless individuals.

Problems of litter and solid waste could be minimized if the rate of chemical deterioration of plastics could be enhanced. This would have the further advantage that the constituent atoms and/or stored energy in such plastics could be re-used in natural ecological processes.

The enhancement of the rate of environmental deterioration of plastics through the use of degradation-promoting additives is known in the prior art. For example, the preparation of degradable polyolefin films containing certain organic derivatives of transition metals is described in U.S. Pat. No. 3,454,510.

In most cases, the additives suggested for use as degradation-promoting agents are themselves non-polymeric in nature. The use of such additives can be complicated by their tendency to be removed from the polymer as a result of gradual vaporization, leaching, diffusion, and/or chemical destruction. Furthermore, the removal of additives under environmental conditions may lead to contamination of the air and water, hazards to wildlife, etc. Likewise, the use of such additives may detract from the useful physical properties of the plastics, and undesired degradation may occur during the preparation of polymer/additive mixtures and the fabrication of plastic articles therefrom.

The present invention is intended to avoid such difficulties through the use of polymeric degradation-promoting additives. A further objective is the minimization of solid-waste disposal problems through the development of secondary uses for recovered or off-grade plastics which are unsuitable for conventional uses.

DESCRIPTION OF THE INVENTION

In accordance with this invention, a degradable plastic material is prepared by the combination of an organic polymer and a degradation-promoting amount of a partially degraded organic polymer.

The phrase "partially degraded organic polymer," as used herein, may be defined as an organic material, which is polymeric as judged by molecular-weight measurements, which has been obtained by the partial chemical destruction of an organic polymer or copolymer. Such chemical destruction may be the result of the action of heat, light, oxygen, water, ionizing radiation, or chemical reagents, individually or in combination.

The partially degraded organic polymer may be obtained as a material recovered from solid waste, as a material degraded during polymer processing, or as the product of a separate "controlled degradation" process. In the latter case, additives and chemical reagents may be employed in order to accelerate and direct the course of the degradation process.

In general, the effectiveness of partially degraded polymers in accelerating the degradation of other polymeric materials can be attributed to the presence of degradation-promoting functional groups. In particular, oxygenated groups (e.g., carbonyl and hydroperoxide groups introduced as a result of partial oxidative degradation) serve to accelerate thermal-oxidative and/or photo-oxidative degradation processes.

The organic polymer base and the degradation-promoting polymer may be the same or different polymers.

Typical organic polymers (and copolymers) contemplated especially include polyethylene, polypropylene, poly(1-butene), poly(4-methyl-1-pentene), ethylene-propylene copolymers, ethylene-1-butene copolymers, ethylene-1-hexene copolymers, ethylene-vinyl acetate copolymers, ethylene-ethyl acrylate copolymers, ethylene-acrylic acid copolymers and their salts, polystyrene, polyvinyl chloride, poly(vinylidene (vinylidene chloride), polyvinyl fluoride, poly(vinylidene fluoride), polyoxymethylene, poly(ethylene oxide), poly(propylene oxide), polyvinyl alcohol, polyvinyl acetate, polyvinyl formal, polyvinyl butyral, poly(methyl acrylate) poly(ethyl acrylate), poly(caprolactam), poly(hexamethyleneadipamide), poly(ethylene terephthalate), vinyl chloride-vinyl acetate copolymers, styrene-butadiene copolymers, styrene-isoprene copolymers, cellulose acetate, cellulose propionate, cellulose acetate butyrate, ethyl cellulose, methyl cellulose, hydroxyethyl cellulose, and hydroxypropyl cellulose. Preferred polymers include polyethylene, polypropylene, poly(4-methyl-1-pentene), polystyrene and polyvinylchloride.

It is contemplated that the degradable polymeric compositions prepared in accordance with this invention will ordinarily contain about 70 to about 99.9% by weight of the polymeric base material and about 0.1 to about 30% of the partially degraded polymeric additive.

The rate of environmental deterioration will depend upon the environmental conditions (wavelength and intensity of light, oxygen pressure, temperature, humidity, etc.); the concentration of the partially degraded polymeric additive; and/or the physical properties and chemical reactivity of the partially degraded polymeric additive and the polymeric base material. Ordinarily, the use of high concentrations of partially degraded polymeric additive will lead to a more rapid deterioration.

The novel plastic compositions of this invention can be prepared by a number of methods. A preferred method consists essentially of heating the polymeric base at a temperature below its decomposition temperature, incorporating the partially degraded polymeric additive, and mixing the ingredients so as to obtain a substantially uniform mixture. The mixture can then be molded and cooled to form a solid molded article. In the alternative, the mixture can be extruded and cooled to form a solid extrudate. Conventional plastic processing equipment can be used for melting the polymer, mixing the polymer with the additive(s) and molding or extruding the resulting mixture. Processing conditions, such as temperature, time, and pressure, will be obvious to those skilled in the art.

Another preferred process for preparing the novel plastic compositions of this invention consists essentially of blending the polymeric base and the partially degraded polymeric additive so as to obtain a substantially uniform mixture. The two materials are preferably in the form of pellets, granules or powder. Conventional plastic processing equipment can be used in the blending operation. The processing conditions will be obvious to those skilled in the art. The resulting mixture can be melted at a temperature below the decomposition temperature of the polymer and additive(s). The resulting melt can be extruded or molded and cooled to form a solid extrudate or molded article.

An alternative process for the preparation of degradable polymeric compositions involves the preparation of a solution or dispersion of the polymeric base material and the partially degraded polymeric additive in a suitable solvent. A film or coating of degradable polymeric material is then prepared by the application of such a solution or dispersion to a substrate such as glass. If desired, the dried film may be removed from the substrate and used as a film.

A coating composition containing the partially degraded polymeric additive may be applied to the surface of a plastic film, sheet, or molded article prepared from the polymeric base material. Alternatively, a composite film or three-dimensional article may be prepared by lamination of separate layers consisting essentially of the polymeric base material and the partially degraded polymeric material, respectively.

The following EXAMPLE represents one of the best embodiments contemplated by the inventors.

EXAMPLE

Unstabilized polypropylene (Profax 6401) is heated 24 hours in an air oven at 160° C. A solution of 0.2 grams of the resulting material and 9.8 grams of unstabilized polyethylene in 200 milliliters of xylene is prepared and used to cast films onto heated glass substrates. One such film, when dry, is subjected for 24 hours to the light from a 16-watt ultraviolet source emitting principally at 305 millimicrons. The infrared spectrum of the irradiated film has a substantial carbonyl peak at ca. 5.8 microns, indicative of oxidative degradation. Irradiation of a similarly prepared film of additive-free polyethylene is shown to cause negligible photo-oxidation under these conditions.

It is further contemplated that the novel degradable plastic compositions of this invention can also contain non-reactive additives. By the term "non-reactive additives" is meant a chemical additive, filler, or reinforcement commonly used in the formulation of plastic compositions which does not materially interfere with the degradation process. For example, the compositions of this invention can contain additives and processing aids, colorants, viscosity depressants, mold-release agents, emulsifiers, and slip agents. The compositions of this invention can also contain anti-oxidants, anti-static agents, and fibrous reinforcements which do not materially detract from the eventual degradation of the composition. The compositions of this invention can also contain fillers, such as barium sulphate, calcium carbonate, calcium silicate, fumed colloidal silica, glass, and clay.

Flame retardants, lubricants, plasticizers, adhesion promoters and stabilizers, such as those used to prevent thermo-oxidative decomposition can also be used. In some cases, it may be desirable to add an antioxidant or stabilizer to permit high temperature processing, even though such additive may slow the degradation process. In other cases, it may be desirable to retard degradation for a limited period of time.

It is further contemplated that films of degradable polymer, prepared in accordance with this invention, may be used as a protective and/or decorative coating for glass containers. The enhanced degradability of such coatings will facilitate their removal from used glass containers, so that the glass can be recovered for re-use.

We claim:

1. A process for preparing a degradable plastic composition, which process comprises:
    a. preparing a partially oxidized organic polymer by heating an oxidizable organic polymer in the presence of gaseous oxygen;
    b. and then incorporating said partially oxidized organic polymer into a thermoplastic organic base polymer different from said oxidizable polymer.

2. A process according to claim 1 wherein said oxidizable organic polymer is heated to a temperature below the decomposition temperature of said oxidizable organic polymer in the presence of gaseous oxygen to form said partially oxidized organic polymer.

3. A process according to claim 2 wherein said organic base polymer and said oxidizable organic polymer are selected from the group consisting of polyethylene, polypropylene, poly (1-butene), poly (4-methyl-1-pentene), ethylene-propylene copolymers, ethylene-1-butene copolymers, ethylene-1-hexene copolymers, ethylene-vinyl acetate copolymers, ethylene-ethyl acrylate copolymers, ethylene-acrylic acid copolymers and their salts, polystyrene, polyvinyl chloride, poly (vinylidene chloride), polyvinyl fluoride, poly (vinylidene fluoride), polyoxymethylene, poly (ethylene oxide), poly (propylene oxide), polyvinyl alcohol, polyvinyl acetate, polyvinyl formal, polyvinyl butyral, poly (methyl acrylate), poly (ethyl acrylate), poly (caprolactam), poly (hexamethyleneadipamide), poly (ethylene terephthalate), vinyl chloride-vinyl acetate copolymers, styrene-butadiene copolymers, styreneisoprene copolymers, cellulose acetate, cellulose propionate, cellulose acetate butyrate, ethyl cellulose, methyl cellulose, hydroxyethyl cellulose, and hydroxypropyl cellulose.

4. A process according to claim 2 wherein about 0.1 to about 30 percent by weight of said partially oxidized organic polymer is incorporated into said thermoplastic organic base polymer, said percent by weight being based on the total weight of said partially oxidized polymer and organic base polymer.

5. A process according to claim 2 wherein said partially oxidized polymer is blended with said organic base polymer in molten form.

6. A process for degrading a thermoplastic organic base polymer, which process comprises:
    a. preparing a partially oxidized organic polymer by heating an oxidizable organic polymer in the presence of gaseous oxygen;

b. incorporating said partially oxidized organic polymer into said thermoplastic organic base polymer; and c. exposing the resultant polymeric composition to at least one natural environmental condition to degrade said composition.

7. A process according to claim 6 wherein said oxidizable organic polymer is heated to a temperature below the decomposition temperature of said oxidizable organic polymer in the presence of gaseous oxygen to form said partially oxidized organic polymer.

8. A process according to claim 6 wherein said organic base polymer and said oxidizable organic polymer are selected from the group consisting of polyethylene, polypropylene, poly (1-butene), poly (4-methyl-1-pentene), ethylene-propylene copolymers, ethylene-1-butene copolymers, ethylene-1-hexene copolymers, ethylene-vinyl acetate copolymers, ethylene-ethyl acrylate copolymers, ethylene-acrylic acid copolymers and their salts, polystyrene, polyvinyl chloride, poly (vinylidene chloride), polyvinyl fluoride, poly (vinylidene fluoride), polyoxymethylene, poly (ethylene oxide), poly (propylene oxide), polyvinyl alcohol, polyvinyl acetate, polyvinyl formal, polyvinyl butyral, poly (methyl acrylate), poly (ethyl acrylate), poly (caprolactam), poly (hexamethyleneadipamide), poly (ethylene terephthalate), vinyl chloride-vinyl acetate copolymers, styrene-butadiene copolymers, styreneisoprene copolymers, cellulose acetate, cellulose propionate, cellulose acetate butyrate, ethyl cellulose, methyl cellulose, hydroxyethyl cellulose, and hydroxypropyl cellulose.

9. A process according to claim 6 wherein about 0.1 to about 30 percent by weight of said partially oxidized organic polymer is incorporated into said thermoplastic organic base polymer, said percent by weight being based on the total weight of said partially oxidized polymer and organic base polymer.

10. A process according to claim 6 wherein said partially oxidized polymer is blended with said organic base polymer in molten form.

11. A process according to claim 6 wherein said natural environmental condition is selected from the group consisting of light, oxygen, elevated temperature and humidity.

12. A process for degrading a thermoplastic organic base polymer, which comprises:

a. incorporating into said organic base polymer a degradation-promoting amount of at least one partially oxidized organic polymer; and b. exposing the resultant polymeric composition to at least one natural environmental condition to degrade said composition.

13. A process according to claim 12 wherein said organic base polymer and said oxidizable organic polymer are selected from the group consisting of polyethylene, polypropylene, poly (1-butene), poly (4-methyl-1-pentene), ethylene-propylene copolymers, ethylene-1-butene copolymers, ethylene-1-hexene copolymers, ethylene-vinyl acetate copolymers, ethylene-ethyl acrylate copolymers, ethylene-acrylic acid copolymers and their salts, polystyrene, polyvinyl chloride, poly (vinylidene chloride), polyvinyl fluoride, poly (vinylidene fluoride), polyoxymethylene, poly (ethylene oxide), poly (propylene oxide), polyvinyl alcohol, polyvinyl acetate, polyvinyl formal, polyvinyl butyral, poly (methyl acrylate), poly (ethyl acrylate), poly (caprolactam), poly (hexamethyleneadipamide), poly (ethylene terephthalate), vinyl chloride-vinyl acetate copolymers, styrene-butadiene copolymers, styreneisoprene copolymers, cellulose acetate, cellulose propionate, cellulose acetate butyrate, ethyl cellulose, methyl cellulose, hydroxyethyl cellulose, and hydroxypropyl cellulose.

14. A process according to claim 12 wherein about 0.1 to about 30 percent by weight of said partially oxidized organic polymer is incorporated into said thermoplastic organic base polymer, said percent by weight being based on the total weight of said partially oxidized polymer and organic base polymer.

15. A process according to claim 12 wherein said partially oxidized polymer is blended with said organic base polymer in molten form.

16. A process according to claim 12 wherein said natural environmental condition is selected from the group consisting of light, oxygen, elevated temperature and humidity.

* * * * *